US009394434B2

(12) United States Patent
Araujo da Silva et al.

(10) Patent No.: US 9,394,434 B2
(45) Date of Patent: Jul. 19, 2016

(54) RUBBER COMPOSITION CONTAINING A MODIFIED ELASTOMER, METHOD FOR PREPARING SAME, AND TIRE CONTAINING SAME

(75) Inventors: José Araujo da Silva, Clermont-Ferrand (FR); Jean-Michel Favrot, Clermont-Ferrand (FR); Anne Frédérique Salit, Clermont-Ferrand (FR); Nicolas Seeboth, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 517 days.

(21) Appl. No.: 13/809,456

(22) PCT Filed: Jul. 12, 2011

(86) PCT No.: PCT/EP2011/061801
§ 371 (c)(1),
(2), (4) Date: Jan. 30, 2013

(87) PCT Pub. No.: WO2012/007442
PCT Pub. Date: Jan. 19, 2012

(65) Prior Publication Data

US 2013/0123418 A1 May 16, 2013

(30) Foreign Application Priority Data

Jul. 13, 2010 (FR) ..................................... 10 02963

(51) Int. Cl.

| | |
|---|---|
| ***C08K 5/32*** | (2006.01) |
| ***C08L 9/06*** | (2006.01) |
| ***B60C 1/00*** | (2006.01) |
| ***C08C 19/22*** | (2006.01) |
| ***C08C 19/28*** | (2006.01) |
| ***C08K 3/36*** | (2006.01) |
| ***C08K 5/3445*** | (2006.01) |
| ***C08K 5/548*** | (2006.01) |

(52) U.S. Cl.
CPC ................. *C08L 9/06* (2013.01); *B60C 1/0016* (2013.04); *C08C 19/22* (2013.01); *C08C 19/28* (2013.01); *C08K 3/36* (2013.01); *C08K 5/32* (2013.01); *C08K 5/3445* (2013.01); *C08K 5/548* (2013.01)

(58) Field of Classification Search
CPC ................................. C08K 5/32; C08L 19/22
See application file for complete search history.

(56) References Cited

U.S. PATENT DOCUMENTS

| | | | |
|---|---|---|---|
| 7,300,970 | B2 | 11/2007 | Durel et al. |
| 7,491,767 | B2 | 2/2009 | Durel et al. |
| 7,820,771 | B2 | 10/2010 | Lapra et al. |
| 7,900,667 | B2 | 3/2011 | Vasseur |
| 2004/0106744 | A1 | 6/2004 | Chino et al. |
| 2005/0239639 | A1 | 10/2005 | Monteil et al. |
| 2006/0084730 | A1 | 4/2006 | Fukushima et al. |
| 2006/0199917 | A1 | 9/2006 | Chino |
| 2008/0103252 | A1 | 5/2008 | Brumbaugh |
| 2009/0270558 | A1 | 10/2009 | Gandon-pain et al. |
| 2010/0004368 | A1 | 1/2010 | Wang |
| 2011/0183098 | A1 | 7/2011 | Hidalgo |

FOREIGN PATENT DOCUMENTS

| | | | |
|---|---|---|---|
| JP | 2008106277 | | 5/2005 |
| JP | 2008517071 | | 4/2006 |
| JP | 2007224074 | | 9/2007 |
| JP | 2008-208163 | A | 9/2008 |
| JP | 2009185281 | | 8/2009 |
| JP | 2010090303 | | 4/2010 |
| WO | WO 97/36724 | A2 | 10/1997 |
| WO | WO 99/16600 | A1 | 4/1999 |
| WO | WO 02/10269 | A2 | 2/2002 |
| WO | WO 03/002648 | A1 | 1/2003 |
| WO | WO 03/002649 | A1 | 1/2003 |
| WO | WO 2004/035639 | A1 | 4/2004 |
| WO | WO 2006/069792 | A1 | 7/2006 |

(Continued)

OTHER PUBLICATIONS

International Search Report (PCT/ISA/210) issued on Sep. 29, 2011, by the European Patent Office as the International Searching Authority for International Application No. PCT/EP2011/061801.

(Continued)

*Primary Examiner* — Peter D Mulcahy
(74) *Attorney, Agent, or Firm* — Dickinson Wright PLLC

(57) ABSTRACT

The invention relates to a rubber composition based on at least one diene elastomer, a reinforcing filler, a chemical crosslinker and a modifier selected from compounds comprising at least one group Q, and at least one group A, which are joined to one another by at least one and preferably one spacer group Sp, wherein:

Q comprises a dipole containing at least one and preferably one nitrogen atom,

A comprises an associative group comprising at least one nitrogen atom,

Sp is an atom or group of atoms forming a bond between Q and A.

This composition has an improved balance between stiffness under moderate deformations/elongation at break and improved hysteresis properties and is therefore especially suited to the manufacture of tires for enhancing the trade off between rolling resistance and resistance to large deformations.

19 Claims, No Drawings

(56) References Cited

FOREIGN PATENT DOCUMENTS

| | | | |
|---|---|---|---|
| WO | WO 2006/069793 | A1 | 7/2006 |
| WO | 2010031956 | | 3/2010 |

OTHER PUBLICATIONS

Maruizio Galimberti et al., Elastomeric Compounds with Slllca. Lower Hysteresis in the Presence of Functionalised Isoprene Oligomers, Macromolecular Symposia, vol. 234, Mar. 13, 2006, (Abstract).

RUBBER COMPOSITION CONTAINING A MODIFIED ELASTOMER, METHOD FOR PREPARING SAME, AND TIRE CONTAINING SAME

The present invention relates to a rubber composition, used especially for the manufacture of tyres, based on least one diene elastomer, a reinforcing filler, a chemical crosslinker and at least one particular modifier.

Within the field of tyre manufacture and more particularly of the formulation of rubber compositions known as treads which are in contact with the ground, there is an ongoing search for means for improving the dispersion of the fillers within the polymers. One of the means for achieving this result is the use of coupling agents capable of establishing interactions between the polymer and the filler.

Agents for coupling a polymer with a filler which comprise nitrogen-containing dipoles are described in the documents published under numbers U.S. Pat. No. 7,186,845B2 and JP2008208163.

These documents describe nitrogen-containing dipolar coupling agents additionally comprising a heterocycle, said heterocycle itself comprising a nitrogen atom, and an oxygen and/or sulphur atom.

More particularly the compounds described are nitrones which carry oxazoline or thiazoline functions, such as, for example, (-(2-oxazolyl)-phenyl-N-methylnitrone)

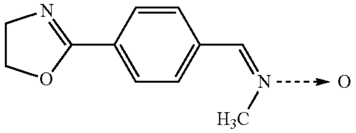

Such coupling agents enable in particular a lowering of the hysteresis losses of the rubber composition, by improving the dispersion of the fillers in an elastomeric matrix.

When diene polymers are reacted with such coupling agents, the resulting polymers will carry the oxazoline or thiazoline rings.

These rings present in the polymer are capable of reacting in turn with surface functions of the fillers (such as carbon black or silica) with which the polymers are mixed. This reaction leads to the formation of covalent bonds between the polymer modified with the coupling agent and the filler, owing to the opening of the oxazoline or thiazoline ring.

In addition to ensuring low rolling resistance by reducing the hysteresis losses, there is a desire to have materials available that possess a high stiffness under average deformations (of 50% to 100%) while ensuring high elongation at break and/or high breaking stress.

The skilled person, though, is aware that when the rubber/filler bond density and/or crosslinking density are/is increased, a reduction in the elongation at break is observed.

Therefore, when the number of covalent bonds between the polymeric chains (bridging density) increases, the stiffness under average deformation increases, but the elongation at break decreases. Conversely, if the bridging density decreases, the elongation at break increases, but the stiffness under average deformations decreases.

The aim of the present invention is to provide a low-hysteresis rubber composition which possesses good, high stiffness under average deformations while at the same time exhibiting a high elongation at break or high breaking stress.

This aim is achieved by virtue of the inventors having found that the balance between good stiffness under average deformation and a high elongation at break was obtainable by modifying the diene elastomer by grafting with a specific modifier comprising at least one nitrogen-containing dipole and at least one nitrogen-containing associative group. An elastomer thus modified endows a composition comprising it with improved hysteresis properties.

In the text below, the phrase "proportion of modifier" present in a rubber composition, expressed as a molar percentage, means the number of molecules of the modifier that are present in the composition per hundred units of diene elastomer in the composition, irrespective of whether the units are diene or non-diene units.

For example, if the proportion of modifier in a SBR is 0.20 mol %, this means that there will be 0.20 unit originating from modifier per 100 styrene and butadiene units in the SBR.

Where both an elastomer already grafted with the modifier and a diene elastomer not grafted with a modifier are used in the composition, the proportion of modifier represents the number of molecules of modifier that are grafted per hundred units of diene elastomers, the number of units taking into account the two elastomers (grafted and non-grafted), on the assumption that no other molecules of modifier not already grafted have been added to the composition.

In the text below, the term "composition based on" means a composition comprising the mixture and/or the reaction product of the various constituents used, some of these base constituents being capable of or intended for reacting with one another, at least partly, during the various phases of manufacture of the composition, more particularly during its crosslinking or vulcanization.

In the present description, unless expressly indicated otherwise, all of the percentages (%) indicated are percent by mass. Moreover, any range of values denoted by the expression "between a and b" represents the range of values from more than a to less than b (i.e. with end points a and b excluded), whereas any range of values denoted by the expression "from a to b" signifies the range of values from a through to b (i.e. including the strict end points a and b).

The invention accordingly provides a rubber composition based on at least one diene elastomer, a reinforcing filler, a chemical crosslinker and a modifier, said modifier comprising at least one group Q, and at least one group A, which are joined to one another by at least one and preferably one spacer group Sp, wherein:

- Q comprises a dipole containing at least one and preferably one nitrogen atom,
- A comprises an associative group comprising at least one nitrogen atom,
- Sp is an atom or group of atoms forming a bond between Q and A.

The invention also provides a method for preparing a rubber composition for tyres, based on at least one diene elastomer, a reinforcing filler, a chemical crosslinker and a modifier, characterized in that it comprises the following steps:

- modifying the diene elastomer by post-polymerization grafting in solution or in bulk of a modifier comprising at least one group Q, and at least one group A, which are joined to one another by at least one and preferably one spacer group Sp, wherein:
  - Q comprises a dipole containing at least one and preferably one nitrogen atom,
  - A comprises an associative group comprising at least one nitrogen atom,
  - Sp is an atom or group of atoms forming a bond between Q and A, incorporating the reinforcing filler into the diene elastomer thus grafted with the modifier, by thermomechanically kneading the combined mixture, one or more times, until a maximum temperature of between 130° C. and 200° C. is reached, cooling the mixture to a temperature of less than 100° C., subsequently incorporating the chemical crosslinker, kneading the complete mixture to a maximum temperature of less than 120° C., extruding or calendering the resulting rubber composition.

The invention further provides a method for preparing a rubber composition for tyres, based on at least one diene elastomer, a reinforcing filler, a chemical crosslinker and a modifier, characterized in that it comprises the following steps:

incorporating into the diene elastomer, in the course of mixing in bulk, a modifier and subsequently the reinforcing filler, said modifier comprising at least one group Q, and at least one group A, which are joined to one another by at least one and preferably one spacer group Sp, wherein:

Q comprises a dipole containing at least one and preferably one nitrogen atom,

A comprises an associative group comprising at least one nitrogen atom,

Sp is an atom or group of atoms forming a bond between Q and A, by thermomechanically kneading the combined mixture, one or more times, until a maximum temperature of between 130° C. and 200° C. is reached, cooling the mixture to a temperature of less than 100° C., subsequently incorporating the chemical crosslinker, kneading the complete mixture to a maximum temperature of less than 120° C., extruding or calendering the resulting rubber composition.

By virtue of its mechanical properties, combining good stiffness under moderate deformation and high elongation at break, and also an improved hysteresis, the rubber composition according to the invention is especially suitable for the manufacture of tyres for enhancing therein the balance between rolling resistance and resistance to large deformations. A tyre comprising such a composition is a further subject of the invention.

A first subject of the invention, then, is a rubber composition based on at least one diene elastomer, a reinforcing filler, a chemical crosslinker and a modifier comprising at least one group Q, and at least one group A, which are joined to one another by at least one and preferably one spacer group Sp, as defined earlier on above.

The first component of the rubber composition according to the invention is a diene elastomer.

Diene elastomers may be classified conventionally in two categories, those said to be substantially unsaturated and those said to be substantially saturated. Both these categories of diene elastomers can be contemplated in the context of the invention.

A substantially saturated diene elastomer has a low or very low proportion of units or moieties of diene origin (conjugated dienes) of always less than 15% (molar %). Accordingly, for example, butyl rubbers or copolymers of dienes and alpha-olefins of EPDM type, fall within the definition of substantially saturated diene elastomers.

In contrast, a substantially unsaturated diene elastomer is a diene elastomer originating at least partly from conjugated diene monomers, having a portion of units or moieties of diene origin (conjugated dienes) of greater than 15% (molar %). Within the category of "substantially unsaturated" diene elastomers, the term "highly unsaturated" diene elastomer means more particularly a diene elastomer having a proportion of units of diene origin (conjugated dienes) of more than 50%.

A diene elastomer capable of being used in the invention is understood more particularly as follows:

(a)—any homopolymer obtained by polymerizing a conjugated diene monomer ranging from 4 to 12 carbon atoms;

(b)—any copolymer obtained by copolymerizing one or more conjugated dienes with one another or with one or more aromatic vinyl compounds having from 8 to 20 carbon atoms;

(c)—a ternary copolymer obtained by copolymerizing ethylene and an α-olefin having 3 to 6 carbon atoms with a non-conjugated diene monomer having from 6 to 12 carbon atoms, such as, for example, elastomers obtained from ethylene and propylene with a non-conjugated diene monomer of the aforementioned type, such as, in particular, 1,4-hexadiene, ethylidene norbornene, dicyclopentadiene; polymers of this kind are described more particularly in documents WO 2004/035639A1 and US 2005/0239639A1;

(d)—a copolymer of isobutene and isoprene (butyl rubber), and also the halogenated versions, more particularly chlorinated or brominated versions, of this type of copolymer.

Although applying to any type of diene elastomer, preference is given to using at least one highly unsaturated diene elastomer, more particularly of type (a) or (b) above.

Suitable conjugated dienes include, in particular, 1,3-butadiene, 2-methyl-1,3-butadiene, 2,3-di($C_1$-$C_5$ alkyl)-1,3-butadienes such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Suitable vinyl aromatic compounds are for example styrene, ortho-, meta- and para-methylstyrene, the commercial mixture "vinyl-toluene", para-tertiobutylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinyl aromatic units. The elastomers may have any microstructure, which is a function of the polymerizing conditions used, in particular the presence or absence of a modifier and/or randomizer, and the amounts of randomizing modifier employed. The elastomers may be, for example, block, random, sequential or microsequential elastomers and may be prepared in dispersion, in emulsion or in solution; they may be coupled and/or star-branched or else functionalized with a coupling and/or star-branching or functionalizing agent.

Particularly suitable are diene elastomers selected from the group consisting of polybutadienes (BR), synthetic polyisoprenes (IR), natural rubber (NR), butadiene copolymers, isoprene copolymers and mixtures of these elastomers. Such copolymers are more preferably selected from the group consisting of butadiene-styrene copolymers (SBR), isoprene-butadiene copolymers (BIR), isoprene-styrene copolymers (SIR), isoprene-butadiene-styrene copolymers (SBIR) and mixtures of such copolymers.

The rubber composition according to the invention is based on at least one diene elastomer and at least one modifier. The diene elastomer may be grafted with the modifier before being introduced into the rubber composition, or else may be grafted by reaction with the modifier during the production of the composition.

The composition in the tyre according to the invention may therefore comprise a single diene elastomer grafted with the modifier (either grafted before being introduced into the composition, or grafted by reaction with the modifier during the production of the composition), or a mixture of two or more diene elastomers, with all of them grafted or with some of them grafted and the others not.

The other diene elastomer or elastomers used in a blend with the grafted elastomers according to the invention are conventional diene elastomers as described above, and may be star-branched, coupled, functionalized or not. In that case these elastomers are present in the matrix in a proportion of between 0 and 60 phr (the end points of this range being excluded), preferably in a proportion of more than 0 to 50 phr, more preferably still of more than 0 to 30 phr.

In the case of a blend with at least one other diene elastomer, the mass fraction of grafted elastomer according to the invention in the elastomeric matrix is preponderant and is preferably greater than or equal to 50% by weight of the total weight of the matrix. The preponderant mass fraction according to the invention is the highest mass fraction in the blend.

It will be noted that the lower the proportion of said complementary elastomer or elastomers in the composition according to the invention, the greater the improvement in the properties of the rubber composition according to the invention.

The grafted diene elastomer or elastomers according to the invention may be used in combination with any type of synthetic elastomer other than a diene elastomer, even with polymers other than elastomers, for example thermoplastic polymers.

A second component of the rubber composition according to the invention is the modifier. This modifier comprises at least one group Q, and at least one group A, which are joined to one another by at least one and preferably one spacer group Sp, wherein:

Q comprises a dipole containing at least one and preferably one nitrogen atom,

A comprises an associative group comprising at least one nitrogen atom,

Sp is an atom or group of atoms forming a bond between Q and A.

A dipole is a function capable of forming a dipolar [1,3] addition to an unsaturated carbon-carbon bond.

An "associative group" is any of the groups capable of associating with one another via hydrogen bonds, ionic bonds and/or hydrophobic bonds. According to one preferred embodiment of the invention, the term refers to groups capable of undergoing association via hydrogen bonds.

When the associative groups are capable of undergoing association via hydrogen bonds, each associative group comprises at least one donor site and one acceptor site for the hydrogen bond, such that two identical associative groups are self-complementary and are able to associate with one another to form at least two hydrogen bonds.

The associative groups according to the invention are also capable of undergoing association via hydrogen bonds, ionic bonds and/or hydrophobic bonds with functions present on fillers.

The compounds according to the invention comprising a group Q, a spacer group and an associative group may be represented for example by the formula (Ia) below:

A-Sp-Q (Ia).

The compounds according to the invention comprising a group Q, a spacer group and two associative groups may be represented for example by the formula (Ib) below:

(Ib)

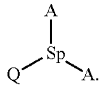

Similarly, the compounds according to the invention comprising two groups Q, a spacer group and a associative group may be represented for example by the formula (Ic) below:

(Ic)

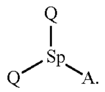

According to the same principle, the compounds according to the invention comprising two groups Q, a spacer group and two associative groups may be represented for example by the formula (Id) below:

(Id)

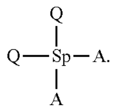

The associative group is preferably selected from a group consisting of imidazolidinyl, ureyl, bis-ureyl, ureido-pyrimidyl and triazolyl.

The group A preferably conforms to one of the formulae (II) to (VI) below:

(II)

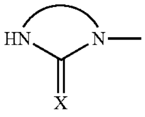

(III)

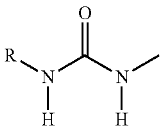

(IV)

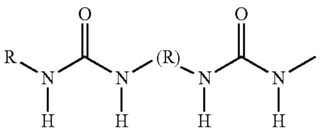

(V)

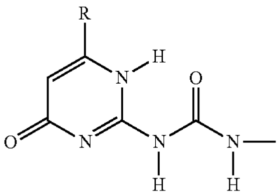

(VI)

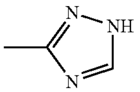

where:

R denotes a hydrocarbon group possibly optionally containing heteroatoms,

X denotes an oxygen or sulphur atom, preferably an oxygen atom.

The group A preferably comprises a 5- or 6-atom heterocycle with two or three nitrogens, preferably two nitrogens, which comprises at least one carbonyl function.

The group A more preferably comprises an imidazolidinyl group of formula (II).

The group Q is capable of bonding to the diene elastomer chain by covalent bonding (grafting). The group Q preferably comprises a nitrile oxide, nitrone or imine nitrile function which is able to bond to a polymer carrying at least one unsaturation, by a [3+2] cycloaddition.

The group Q is preferably a group of formula (VII), (VIII) or (IX) below (VII)

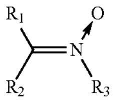

(VIII)

$R_4$—C≡N→O (IX)

$R_5$—C≡N→N—$R_6$ in which R1 to R6 are selected independently from a spacer group Sp, a hydrogen atom, a linear or branched $C_1$-$C_{20}$ alkyl group, a linear or branched $C_3$-$C_{20}$ cycloalkyl group, a linear or branched $C_6$-$C_{20}$ aryl group and a group of formula (X)

(X)

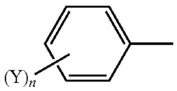

in which n represents 1, 2, 3, 4 or 5 and each Y represents independently a spacer group Sp, an alkyl group or a halide.

The spacer group Sp allows the joining of at least one group Q and/or at least one associative group, A, and may therefore be of any type known per se. The spacer group however, must not interfere or must interfere little with the Q and associative groups of the compound according to the invention.

Said spacer group is therefore considered to be a group which is inert towards the group Q. The spacer group is preferably a linear, branched or cyclic hydrocarbon chain which may contain one or more aromatic radicals and/or one or more heteroatoms. Said chain may optionally be substituted, provided that the substituents are inert towards groups Q.

According to one preferred embodiment, the spacer group is a $C_1$-$C_{24}$, preferably $C_1$-$C_{10}$, linear or branched alkyl chain, and more preferably a $C_1$-$C_6$ linear alkyl chain, optionally comprising one or more heteroatoms selected from nitrogen, sulphur, silicon or oxygen atoms.

According to one embodiment of the invention, the group Q is preferably a group of formula (XIa) or (XIb):

(XIa)

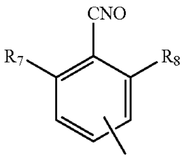

(XIb)

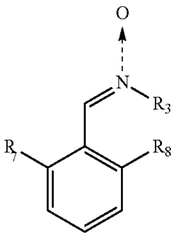

in which R7 and R8 represent independently a hydrogen or a $C_1$-$C_5$ alkyl group, an alkoxy or a halide, and preferably R7 and R8 represent independently an alkyl group or a halide, and more preferably R7 and R8 represent independently a methyl group or a chlorine atom, $R_3$ is as defined above, and the group A is a group of formula (XII):

(XII)

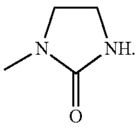

The compound intended for grafting the polymer in accordance with the invention is therefore preferably selected from the compounds of formula (XIII) to (XXI) below:

(XIII)

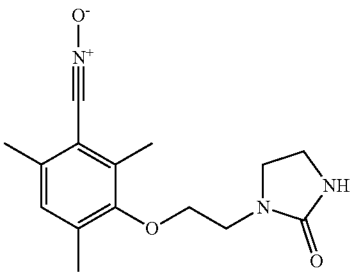

(XIV)

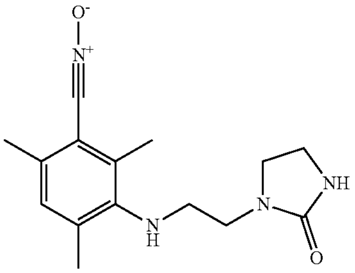

-continued (XV)

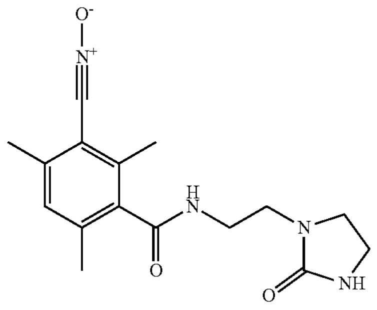

(XVI)

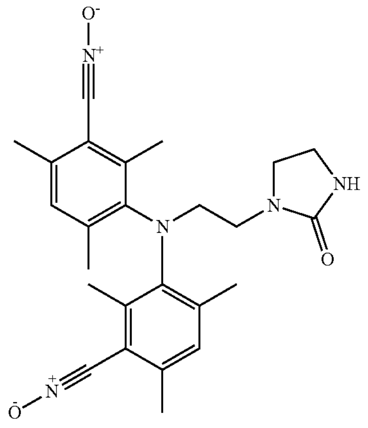

(XVII)

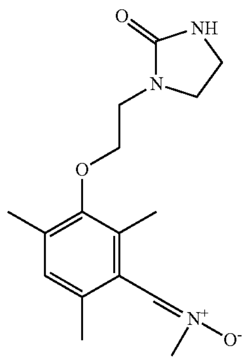

(XVIII)

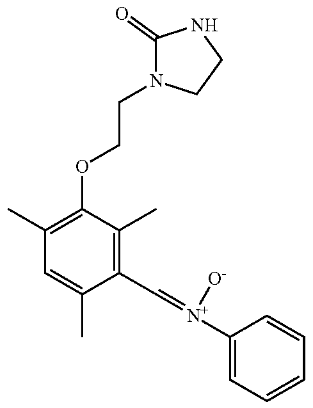

-continued (XIX)

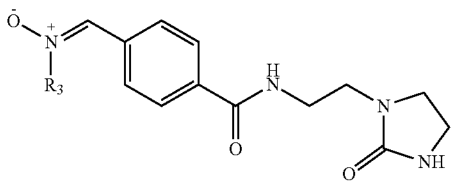

where R3 is as defined above.

(XX)

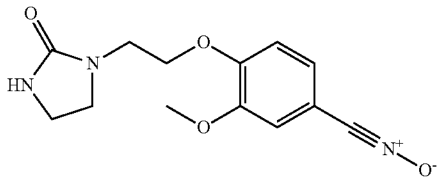

(XXI)

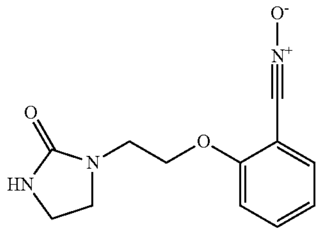

According to another embodiment of the invention, the compound intended for grafting the polymer in accordance with the invention is selected from the compounds of formula (XXII) and (XXIII).

(XXII)

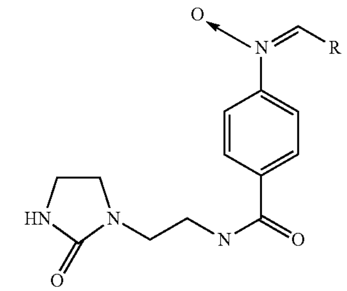

(XXIII)

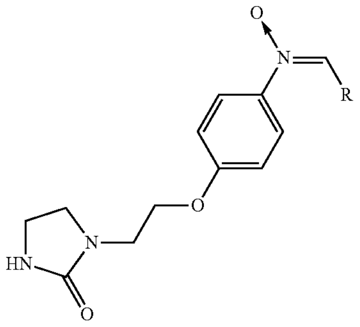

in which R is selected from a spacer group Sp, a hydrogen atom, a linear or branched $C_1$-$C_{20}$ alkyl group, a linear or branched $C_3$-$C_{20}$ cycloalkyl group, a linear or branched $C_6$-$C_{20}$ aryl group, and a group of formula (X)

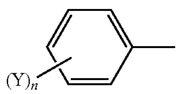

(X)

in which n represents 1, 2, 3, 4 or 5 and each Y represents independently a spacer group Sp, an alkyl group or a halide.

According to one preferred embodiment, the proportion of modifier is from 0.01 to 50 mol %, preferably from 0.01 to 5 mol %.

Another component of the composition according to the invention is the reinforcing filler.

Use may be made of any type of reinforcing filler known for its capacities to reinforce a rubber composition that can be used for the manufacture of tyres, as for example an organic reinforcing filler such as carbon black, an inorganic reinforcing filler such as silica, or else a blend of these two types of filler, more particularly a blend of carbon black and silica.

As carbon blacks all carbon blacks are suitable, especially the blacks of types HAF, ISAF and SAF that are conventionally used in tyres (known as tyre-grade blacks). Depending on the intended applications, it is also possible to use carbon blacks of higher series FF, FEF, GPF and SRF. The carbon blacks might, for example, already be incorporated into the diene elastomer, in the form of a masterbatch, before or after grafting, and preferably after grafting (see, for example, patent applications WO 97/36724 or WO 99/16600).

Examples of organic fillers other than carbon blacks include organic, functionalized polyvinylaromatic fillers such as those described in patent applications WO-A-2006/069792 and WO-A-2006/069793.

An "inorganic reinforcing filler" should be understood in the present patent application, by definition, to be any inorganic or mineral filler, as opposed to carbon black, that is capable by itself, without any means other than an intermediate coupling agent, of reinforcing a rubber composition intended for the manufacture of tyres—in other words it is able to replace, in its reinforcing function, a conventional tyre-grade carbon black; a filler of this kind is generally characterized, as is known, by the presence of hydroxyl groups (—OH) on its surface.

The physical state in which the inorganic reinforcing filler is present is unimportant, whether the form in question be that of a powder, micropearls, granules, beads or any other appropriate densified form. The term "inorganic reinforcing filler" of course also includes mixtures of different inorganic reinforcing fillers, more particularly mixtures of highly dispersible siliceous and/or aluminous fillers as described below.

Inorganic reinforcing fillers particularly suitable are mineral fillers of the siliceous type, more particularly silica (SiO2), or of aluminous type, more particularly alumina (Al2O3).

According to the invention, the proportion of reinforcing filler in the composition is between 30 and 150 phr, more preferably between 50 and 120 phr. The optimum proportion varies according to the particular intended applications.

According to one embodiment, the reinforcing filler comprises primarily silica, the proportion of carbon black present in the composition being preferably between 2 and 20 phr.

According to another embodiment of the invention, the reinforcing filler comprises primarily carbon black, or is even exclusively composed of carbon black.

In order to couple the inorganic reinforcing filler with the diene elastomer, use is made, conventionally, of a coupling agent (or bonding agent) which is at least difunctional, intended to provide a sufficient connection, of chemical and/or physical nature, between the inorganic filler (surface of its particles) and the diene elastomer, and more particularly of difunctional polyorganosiloxanes or organosilanes.

Use is made in particular, conventionally, of "symmetrical" or "asymmetrical" polysulphide silanes, termed such according to their particular structure, of the kind described, for example, in patent applications WO03/002648 and WO03/002649.

In the rubber compositions within the tyre according to the invention, the amount of coupling agent is preferably between 4 and 12 phr, more particularly between 3 and 8 phr.

The skilled person will understand that, as a filler equivalent to the inorganic reinforcing filler described in the present paragraph, another kind of reinforcing filler may be used, particularly an organic filler, provided that this reinforcing filler is covered with an inorganic layer such as silica, or alternatively comprises on its surface functional sites, especially hydroxyls, necessitating the use of a coupling agent to establish the bond between the filler and the elastomer.

Another component of the composition according to the invention is the chemical crosslinker.

Chemical crosslinking allows the formation of covalent bonds between the elastomer chains. Chemical crosslinking may take place by means of a vulcanizing system or else by means of peroxide compounds.

The actual vulcanizing system is based on sulphur (or on a sulphur donor) and on a primary vulcanization accelerator. This base vulcanizing system is supplemented with various known secondary accelerators or vulcanization activators, incorporated during the first, non-productive phase and/or during the productive phase as later described, such as with zinc oxide, stearic acid or equivalent compounds, and/or guanidine derivatives (more particularly diphenylguanidine).

The sulphur is used at a preferred proportion of between 0.5 and 12 phr, more particularly between 1 and 10 phr. The primary vulcanization accelerator is used at a preferred proportion of between 0.5 and 10 phr, more preferably between 0.5 and 5.0 phr.

As accelerator (primary or secondary) it is possible to use any compound capable of acting as an accelerator to vulcanization of the diene elastomers in the presence of sulphur, especially thiazole accelerators and derivatives thereof, thiurame accelerators and zinc dithiocarbamate accelerators. It is preferred to use a sulphenamide primary accelerator.

When chemical crosslinking is performed by means of one or more peroxide compounds, the peroxide compound or compounds represent from 0.01 to 10 hr.

Peroxide compounds which can be used as a chemical crosslinking system include acyl peroxides, for example benzoyl peroxide or p-chlorobenzoyl peroxide, ketone peroxides, for example methyl ethyl ketone peroxide, peroxyesters, for example t-butyl peroxyacetate, t-butyl peroxybenzoate and t-butyl peroxyphthalate, alkyl peroxides, for example dicumyl peroxide, di-t-butyl peroxybenzoate and 1,3-bis(t-butyl peroxyisopropyl)benzene and hydroperoxides, for example t-butyl hydroperoxide.

The rubber composition according to the invention may also comprise some or all of the usual additives commonly used in elastomer compositions intended for the manufacture of tyres, more particularly of treads, such as, for example, plasticizers or extender oils, the latter being either aromatic or non-aromatic, pigments, protectants such as anti-ozone waxes (such as Cire Ozone C32 ST), chemical antiozonants, antioxidants (such as 6-paraphenylenediamine), anti-fatigue agents, reinforcing resins, acceptors (for example phenolic novolak resin) or donors of methylene (for example HMT or H3M) as described, for example, in patent application WO 02/10269, and adhesion promoters (Cobalt salts for example).

The composition according to the invention preferably comprises, as preferred non-aromatic or very slightly aromatic plasticizer, at least one compound selected from the group consisting of naphthenic oils, paraffinic oils, MES oils, TDAE oils, glycerol esters (more particularly trioleates), plasticizing hydrocarbon resins having a high Tg of preferably greater than 30° C., and mixtures of such compounds.

As a complement to the coupling agents, the composition according to the invention may further comprise coupling activators for the inorganic reinforcing filler, or more generally processing aids which are capable in a known way of enhancing the processability of the compositions in the crude state, by virtue of an improvement in the dispersion of the inorganic filler in the rubber matrix and of a lowering of the viscosity of the compositions.

A further subject of the invention is the method for preparing the above-described rubber composition.

The rubber composition according to the invention is manufactured in suitable mixers, using two successive preparation phases according to a general procedure which is well known to the skilled person: a first phase of thermomechanical working or kneading (sometimes termed "non-production" phase) at high temperature, up to a maximum temperature of between 130° C. and 200° C., preferably between 145° C. and 185° C., followed by a second phase of mechanical working (sometimes termed "productive" phase) at a lower temperature, typically of less than 120° C., for example between 60° C. and 100° C., a finishing phase during which the chemical crosslinking system is incorporated.

Generally speaking, all of the base constituents of the composition present in the tyre of the invention, with the exception of the chemical crosslinking system, these being the reinforcing filler or fillers and the coupling agent where appropriate, are incorporated intimately by kneading, into the diene elastomer or diene elastomers during the first, non-productive phase; in other words, at least these various base constituents are introduced into the mixer and kneaded thermomechanically, in one or more steps, until the maximum temperature of between 130° C. and 200° C., preferably between 145° C. and 185° C., is reached.

According to a first embodiment of the invention, the diene elastomer has been grafted with the modifier prior to the manufacture of the rubber composition. In this case, therefore, it is the grafted diene elastomer which is introduced during the first, non-productive phase. Hence according to this first embodiment of the method, the method comprises the following steps:

- modifying the diene elastomer in post-polymerization or in solution or in bulk by grafting of a modifier comprising at least one group Q, and at least one group A, which are joined to one another by at least one and preferably one spacer group Sp as described earlier on above,
- incorporating the reinforcing filler and all of the base constituents of the composition, with the exception of the chemical crosslinking system, into the diene elastomer thus grafted with the modifier, by thermomechanically kneading the combined mixture, one or more times, until a maximum temperature of between 130° C. and 200° C., preferably between 145° C. and 185° C., is reached,
- cooling the mixture to a temperature of less than 100° C.,
- subsequently incorporating the chemical crosslinker,
- kneading the completed mixture to a maximum of less than 120° C.,
- extruding or calendering the resulting rubber composition.

According to a second embodiment of the invention, the grafting of the diene elastomer with the modifier is carried out simultaneously with the manufacture of the rubber composition. In this case, both the as yet ungrafted diene elastomer and the modifier are introduced during the first, non-productive phase. Preferably, the reinforcing filler is then added subsequently, during this non-productive phase, in order to prevent any interfering reaction with the modifier.

Therefore, according to this second embodiment of the method, the method comprises the following steps:

- incorporating into the diene elastomer a modifier comprising at least one group Q, and at least one group A, which are joined to one another by at least one and preferably one spacer group Sp, as described earlier on above, at a temperature and for a time such that the grafting yield is preferably greater than 60%, more preferably greater than 80%, and, preferably subsequently, incorporating the reinforcing filler, and also all of the base constituents of the composition, with the exception of the chemical crosslinking system, by thermomechanically kneading the whole mixture, one or more times, until a maximum temperature of between 130° C. and 200° C., preferably between 145° C. and 185° C., is reached,
- cooling the whole mixture to a temperature of less than 100° C.,
- subsequently incorporating the chemical crosslinker,
- kneading the whole mixture to a maximum temperature of less than 120° C.,
- extruding or calendering the resulting rubber composition.

The grafting of the elastomer takes place by reaction of said elastomer with the reactive group or groups carried by the modifier. During this reaction, this reactive group or these reactive groups form covalent bonds with the chain of the elastomer.

The grafting of the modifier may be carried out in bulk, for example in an internal mixer or an external mixer such as an open mill. Grafting is then performed either at a temperature of the external mixer or of the internal mixer of less than 60° C., followed by a grafting reaction step in a press or in an oven of temperatures from 80° C. to 200° C., or at a temperature of the external mixer or of the internal mixer of greater than 60° C., without subsequent heat treatment.

The process of grafting may also be carried out in solution, continuously or batchwise. The polymer thus modified may be separated from its solution by any means known to the skilled person, and more particularly by a steam stripping operation.

The grafting of the modifier is carried out by [3+2] cycloaddition of the reactive group or groups of the modifier and one or more double bonds in the chain of the polymer. The mechanism of the cycloaddition may be illustrated by the following equations:

- Cycloaddition of a nitrile oxide to an unsaturation or double bond of the polymer (in this case a polysisoprene)

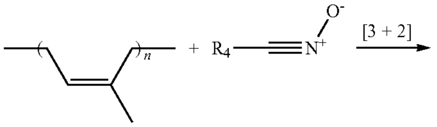

-continued

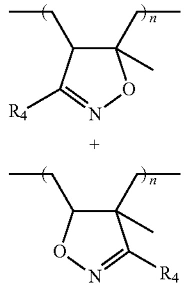

Cycloaddition of a nitrone to an unsaturation or double bond of the polymer (in this case a polyisoprene)

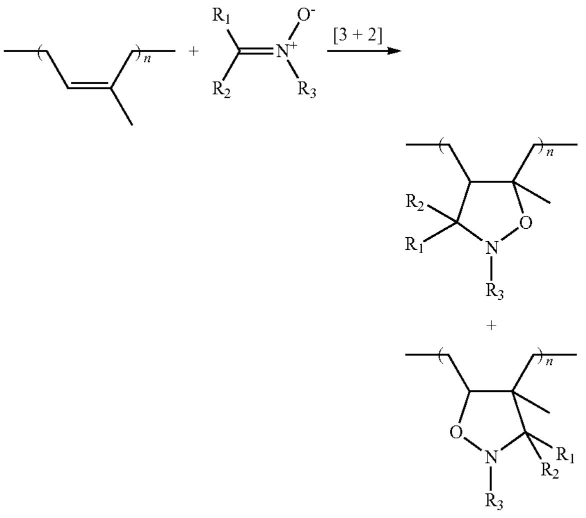

Cycloaddition of an imine nitrile to an unsaturation or double bond of the polymer (in this case a polyisoprene)

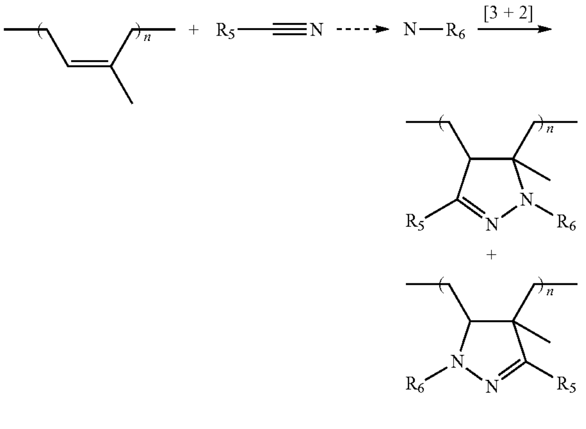

By way of example, the first (non-productive) phase is conducted in a single thermomechanical step, during which all of the required constituents, any complementary processing aids and various other additives, with the exception of the chemical crosslinking system, are introduced into an appropriate mixer, such as a customary internal mixer. The total kneading time in this non-productive phase is preferably between 1 and 15 minutes. After the resulting mixture has cooled during the first, non-productive phase, the chemical crosslinking system is then incorporated at low temperature, generally in an external mixer such as an open mill; the whole mixture is then mixed (productive phase) for a number of minutes, for example between 2 and 15 minutes.

The final composition thus obtained is subsequently calendared for example in the form of a sheet or a plaque, in particular for laboratory characterization, or else is extruded in the form of a rubber profiled element which can be used as a semi-finished vehicle tyre.

The invention and its advantages will be readily understood in the light of the working examples below.

WORKING EXAMPLES

I. Measurements and Tests Used

The elastomers and rubber compositions are characterized, before and after curing, as indicated below.

Determining the Proportion of Modifier

The molar proportion of grafted nitrile oxide compound is determined by NMR analysis. The spectra are acquired on a Bruker 500 MHz spectrometer equipped with a 5 mm BBIz-grade “broadband” probe. The quantitative $^{1}H$ NMR experiment uses a simple 30° pulse sequence and a repetition time of 3 seconds between each acquisition. The samples are dissolved in carbon disulphide (CS2). 100 μl of deuterated cyclohexane (C6D12) are added for the lock signal.

The $^{1}H$ NMR spectrum enables quantification of the grafted nitrile oxide units by integration of the characteristic signals for the CH2N and CH2O protons, which appear at a chemical shift of between δ=3.1-3.8 ppm.

The 2D HSQC $^{1}H$-$^{13}C$ NMR spectrum enables verification of the nature of the grafted unit, by virtue of the chemical shifts of the carbon atoms and proton.

Glass Transition Temperature

The glass transition temperatures, Tg, of the polymers are measured using a differential scanning calorimeter. The analysis is performed in accordance with the requirements of standard ASTM D3418-08.

Near-Infrared (NIR) Spectroscopy

Near-infrared (NIR) spectroscopy is used to determine on a quantitative basis the proportion by mass of styrene in the elastomer and also its microstructure (relative distribution of the 1,2-vinyl, 1,4-trans and 1,4 cis butadiene units). The principle of the method is based on the Beer-Lambert law, generalized to a multi-component system. As the method is indirect, it employs a multivariate calibration [Vilmin, F.; Dussap, C.; Coste, N. Applied Spectroscopy 2006, 60, 619-29] carried out using standard elastomers having a composition determined by $^{13}C$ NMR. The proportion of styrene and the microstructure are then calculated from the NIR spectrum of an elastomer film with a thickness of approximately 730 μm. The spectrum is acquired in transmission mode of between 4000 and 6200 $cm^{-1}$ with a resolution of 2 $cm^{-1}$, using a Bruker Tensor 37 Fourier-transform near-infrared spectrometer equipped with an InGaAs detector cooled by Peltier effect.

Size Exclusive Chromatography

Size exclusive chromatography or SEC is used. SEC enables separation of the macromolecules in solution according to their size, through columns filled with a porous gel. The macromolecules are separated according to their hydrodynamic volume, with the bulkiest being eluted first.

Although not an absolute method, SEC allows the distribution of the molar masses of a polymer to be appreciated. On the basis of commercial standard products, the different number-average (Mn) and weight-average (Mw) molar masses can be determined and the polydispersity index (Ip=Mw/Mn) can be calculated via a Moore calibration.

Preparation of the Polymer:

There is no special treatment of the polymer sample before analysis. It is simply dissolved, in (tetrahydrofuran+1 vol % of diisopropylamine+1 vol % of triethylamine+1 vol % of distilled water) or in chloroform, at a concentration of approximately 1 g/l. The solution is then filtered through a filter with a porosity of 0.45 μm before injection.

SEC Analysis:

The apparatus used is a Water alliance chromatograph. The elution solvent is tetrahydrofuran+1 vol %. of diisopropylamine+1 vol %. of triethylamine, or chloroform, depending on the solvent used for dissolving the polymer. The flow rate is 0.7 ml/min, the temperature of the system is 35° C. and the analysis time is 90 minutes. A set of four Waters columns in series is used, with tradenames Styragel HMW7, Styragel HMW6E and two Styragel HT6E.

The volume of the polymer sample solution injected is 100 μl. The detector is a Waters 2410 differential refractometer, and the software for analyzing the chromatographic data is the Waters Empower system.

The calculated average molar masses relate to a calibration curve produced from commercial PSS Ready CAL-KIT polystyrene standards.

Tensile Tests

These tensile tests enable determination of the elasticity stresses and the properties at break. Unless indicated otherwise, they are carried out in accordance with French standard NF T 46-002 of September 1988. Processing the tensile recordings also makes it possible to plot the curve of modulus as a function of elongation. The modulus used here is the nominal (or apparent) secant modulus measured in first elongation, calculated by reduction to the initial cross section of the test specimen. The nominal secant moduli (or apparent stresses in MPa) are measured in first elongation at 100% and 300% elongation, identified respectively as ASM100 and ASM300.

The breaking stresses (in MPa) and the elongations at break (in %) are measured at 23° C.±2° C. and at 100° C.±2° C., in accordance with standard NF T 46-002.

Dynamic Properties

The dynamic properties ΔG* and tan(δ)max are measured on a viscosity analyzer (Metravib VA4000), in accordance with standard ASTM D 5992-96. A recording is made of the response of a sample of vulcanized composition (cylindrical test specimen with a thickness of 4 mm and a cross section of 400 mm$^2$), which is subjected to an alternating sinusoidal stress in simple shear, at a frequency of 10 Hz, under standard temperature conditions (23° C.) in accordance with standard ASTM D 1349-99, or, where appropriate, at a different temperature (100° C.). A strain amplitude sweep is carried out from 0.1% to 100% (outward cycle) and then from 100% to 0.1% (return cycle). The results utilized are the complex dynamic shear modulus (G*) and the loss factor tan(δ). For the return cycle, the maximum value of tan(δ) observed, identified as tan(δ)max, and also the difference in complex modulus (ΔG*) between the values at 0.1% and at 100% strain (Payne effect) are indicated.

II. Examples of Compositions

II-1. Preparation of the Modifier a) Preparation of 1-(2-(3'-nitrileoxymesityl-1'-oxy)ethyl)imidazolidin-2-one

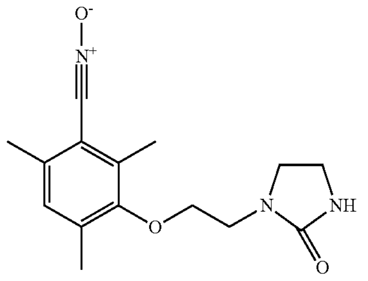 [SMILES: Cc1cc(C)c(OCCN2CCNC2=O)c(C)c1C#[N+][O-]]

This compound may be prepared from mesitol from hydroxyethylimidazolidone in accordance with the synthesis scheme below.

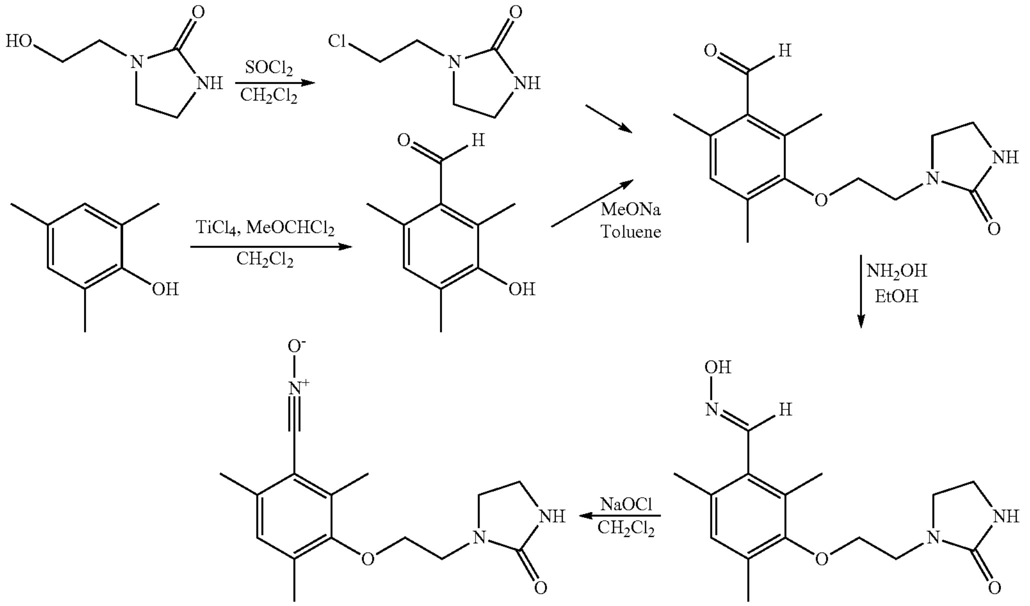

b) Preparation of 3-hydroxy-2,4,6-trimethylbenzaldehyde

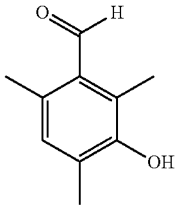

This compound may be obtained by a procedure described in the following article: Yakubov, A. P.; Tsyganov, D. V.; Belen'kii, L. I.; Krayushkin, M. M.; Bulletin of the Academy of Sciences of the USSR, Division of Chemical Science (English Translation); vol. 40; No. 7.2; (1991); pp. 1427-1432; Izvestiya Akademii Nauk SSSR, Seriya Khimicheskaya; No. 7; (1991); pp. 1609-1615.

c) Preparation of 1-(2-chloroethyl)imidazolidin-2-one

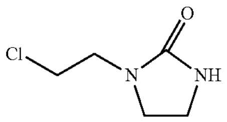

This product is described in the article Nagarajan K., Arya V. P., Shah R. K.; Indian Journal of Chemistry, Section B: Organic Chemistry Including Medicinal Chemistry; 21; 10; 1982; 928-940.

A solution of 1-(2-hydroxyethyl)imidazolidin-2-one (50.0 g, 0.39 mol) in dichloromethane (250 ml) is admixed dropwise at ambient temperature with thionyl chloride (34 ml, 0.47 mol) over 35 minutes. At the end of the addition, the temperature of the reaction mixture is 35° C. The reaction mixture is held at a temperature of 35-40° C. for 2.5 hours. Evaporation under reduced pressure (Tbath 35° C., 15-17 mbar) gives the crude product (67 g). This crude product is recrystallized from a mixture of acetone and petroleum ether (35 g for 950 ml of acetone and 820 ml of petroleum ether at −24° C. for 10 to 15 hours). The crystals are filtered, washed with petroleum ether (two times 40 ml) and then dried for 10 to 15 hours at ambient temperature under atmospheric pressure.

This gives a white solid (33.3 g, 66% yield) with a melting point of 93° C.

The molar purity is more than 97% ($^{1}$H NMR).

A $^{1}$H and $^{13}$C NMR characterization is shown in table 1 below.

TABLE 1

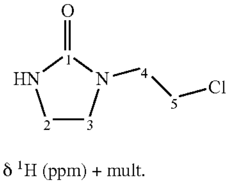

| Atom | δ $^{1}$H (ppm) + mult. | δ $^{13}$C (ppm) |
|---|---|---|
| 1 | — | 162.1 |
| 2 | 3.17 (t) | 37.5 |
| 3 | 3.33 (t) | 44.7 |

TABLE 1-continued

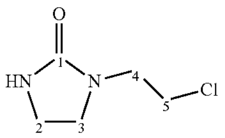

| Atom | δ $^{1}$H (ppm) + mult. | δ $^{13}$C (ppm) |
|---|---|---|
| 4 | 3.29 (t) | 45.0 |
| 5 | 3.62 (t) | 42.4 |

Solvent used: DMSO—Calibration on the signal of DMSO at 2.44 ppm in $^{1}$H, 39.5 ppm in $^{13}$C.

d) Preparation of 2,4,6-trimethyl-3-(2-(2-oxoimidazolidin-1-yl)ethoxy)benzaldehyde

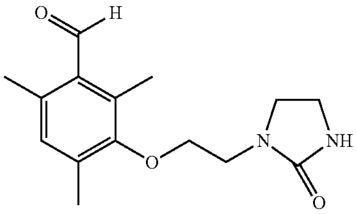 [SMILES: Cc1cc(C)c(OCCN2CCNC2=O)c(C)c1C=O]

A solution of sodium (1.63 g, 0.071 mol) in methanol (60 ml) is admixed dropwise with 3-hydroxy-2,4,6-trimethylbenzaldehyde (11.90 g, 0.073 mol) in anhydrous toluene (300 ml). The mixture is heated to reflux and then the methanol is distilled (volume of azeotropic mixture covered 80-90 ml). After a return to 80-90° C., (2-chloroethyl)imidazolidin-2-one (10.45 g, 0.070 mol) is added all at once to the reaction mixture. After 7 hours of reflux, the solvents are evaporated under reduced pressure (Tbath 50° C., 25 mbar). The resulting mixture is admixed with dichloromethane (150 ml) and water (30 ml). The organic phase is subsequently washed twice with water (20 ml). After drying over Na2SO4, the dichloromethane is evaporated under reduced pressure (Tbath 35° C., 33 mbar). The resulting mixture (24 g) is admixed with petroleum ether (three times 50 ml) and water (50 ml) and the precipitate obtained is filtered off and washed on the filter with water (15 ml) and petroleum ether (two times 15 ml).

The resulting product is repurified by washing it in solution in dichloromethane (80 ml) with a 4% solution of NaOH in water (three times 60 ml). Following evaporation of the solvents under reduced pressure, the product is precipitated from petroleum ether. The precipitate is filtered off and dried for 15 to 20 hours at ambient temperature under atmospheric pressure.

This gives a white solid (8.55 g, 44% yield) with a melting point of 139° C.

The molar purity is greater than 94% ($^{1}$H NMR).

A $^{1}H$ and $^{13}C$ NMR characterization is shown in table 2 below.

TABLE 2

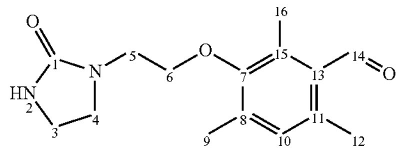

| Atom | δ $^{1}H$ (ppm) + mult. | δ $^{13}C$ (ppm) |
|---|---|---|
| 1 | — | 163.1 |
| 2 | ~4.74 (s) | — |
| 3 | 3.40 (t) | 38.1 |
| 4 | 3.65 (t) | 46.8 |
| 5 | 3.52 (t) | 43.9 |
| 6 | 3.79 (t) | 71.3 |
| 7 | — | 153.9 |
| 8 | — | * |
| 9 | 2.23/2.46 (s) | 16.5/19.8 |
| 10 | 6.84 | 131.7 |
| 11 | — | * |
| 12 | 2.23/2.46 (s) | 16.5/19.8 |
| 13 | — | * |
| 14 | ~10.46 (s) | 193.0 |
| 15 | — | * |
| 16 | 2.46 (s) | 12.1 |

* 131.4/133.5/136.6/136.7 ppm: the chemical shifts of the $^{13}C$ atoms in the aromatic ring are not assigned.

Solvent used: $CDCl_3$—Calibration on the signal of chloroform at 7.2 ppm in $^{1}H$, 77 ppm in $^{13}C$.

e) Preparation of 2,4,6-trimethyl-3-(2-(2-oxoimidazolidin-1-yl)ethoxy)benzaldehyde oxime

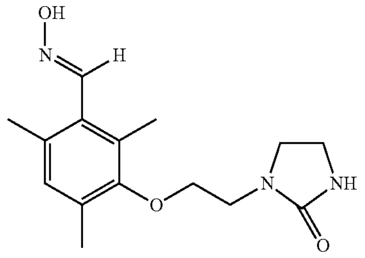 [SMILES: Cc1cc(C)c(OCCN2CCNC2=O)c(C)c1/C=N/O]

A solution of 2,4,6-trimethyl-3-(2-(2-oxoimidazolidin-1-yl)ethoxy)benzaldehyde (7.90 g, 0.029 mol) in ethanol (70 ml), which is kept at a temperature of 45° C., is admixed with an aqueous solution of hydroxylamine (2.83 g, 0.043 mol., 50% in water) in ethanol (10 ml). The reaction mixture is subsequently stirred for 2.5 hours at a temperature of between 50 and 55° C. The solvent is evaporated under reduced pressure (Tbath 37° C., 35 mbar). The crude product obtained is admixed with petroleum ether (80 ml). The precipitate obtained is filtered, washed with petroleum ether (two times 20 ml) and dried for 15 to 20 hours at ambient temperature under atmospheric pressure.

This gives a white solid (7.82 g, 94% yield) with a melting point of 165° C.

The molar purity is greater than 84% (the remaining 16% includes in particular 7 mol % of EtOH) according to $^{1}H$ NMR.

A $^{1}H$ and $^{13}C$ NMR characterization is shown in table 3 below.

TABLE 3

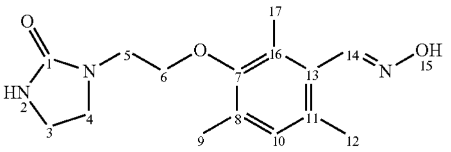

| Atom | δ $^{1}H$ (ppm) + mult. | δ $^{13}C$ (ppm) |
|---|---|---|
| 1 | — | 162.0 |
| 2 | ~6.30 (s) | — |
| 3 | 3.19 (t) | 37.1 |
| 4 | 3.44 (t) | 45.5 |
| 5 | 3.34 (t) | 43.2 |
| 6 | 3.69 (t) | 70.3 |
| 7 | — | 153.5 |
| 8 | — | * |
| 9 | 2.14 (s) | 15.4 |
| 10 | — | 130.5 |
| 11 | — | * |
| 12 | 2.18 (s) | 19.9 |
| 13 | — | * |
| 14 | ~8.20 (s) | 147.4 |
| 15 | ~11.10 (s) | — |
| 16 | — | * |
| 17 | 2.17 (s) | 12.9 |

* 129.3/129.5/131.9 ppm: the chemical shifts of the $^{13}C$ atoms in the aromatic ring are not assigned, three signals are detected (probably two carbons under a single signal).

Solvent used: DMSO—Calibration on the signal of DMSO at 2.44 ppm in $^{1}H$, 39.5 ppm in $^{13}C$.

f) Preparation of 2,4,6-trimethyl-3-(2-(2-oxoimidazolidin-1-yl)ethoxy)nitrile oxide, Compound According to the Invention

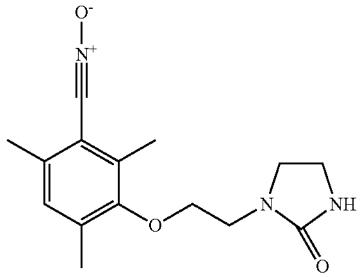 [SMILES: Cc1cc(C)c(OCCN2CCNC2=O)c(C)c1C#[N+][O-]]

A solution of oxime prepared beforehand (6.00 g, 0.021 mol) in dichloromethane (250 ml), at the temperature of 2° C., is admixed dropwise with an aqueous solution of NaOCl (4% active chlorene, 52 ml) over 5-7 minutes. The temperature of the reaction mixture is held at between 0 and −4° C. The reaction mixture is subsequently stirred for 3 hours at a temperature of between 0 and 5° C. The organic phase is then separated off. The aqueous phase is extracted with dichloromethane (two times 15 ml). The organic phases are combined and then washed with water (two times 20 ml) and dried over Na2SO4. The volume of solvent is reduced by evaporation under reduced pressure (Tbath 22° C., 220 mbar) to 50-60 ml. Petroleum ether (75 ml) is then added and the solution is taken to −18° C. for 10-15 hours. The resulting precipitate is filtered and washed with an ethyl acetate/petroleum ether (1/2) mixture (10 ml) and is lastly dried for 10-15 hours at ambient temperature under atmospheric pressure.

This gives a white solid (4.70 g, 79% yield) with a melting point of 156° C.

The molar purity is greater than 85% ($^{1}H$ NMR).

A $^1H$ and $^{13}C$ NMR characterization is shown in table 4 below.

TABLE 4

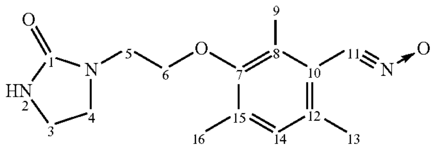

| Atom | δ $^1H$ (ppm) + mult. | δ $^{13}C$ (ppm) |
|---|---|---|
| 1 | — | Not detected, not attributed |
| 2 | ~4.59 (s) | — |
| 3 | 3.41 (t) | 38.3 |
| 4 | 3.64 (t) | 47.0 |
| 5 | 3.51 (t) | 44.1 |
| 6 | 3.79 (t) | 71.5 |
| 7 | — | 153.6 |
| 8 | — | 134.4/137.3* |
| 9 | 2.32 (s) | 14.8 |
| 10 | — | 112.8 |
| 11 | — | Not detected, not attributed |
| 12 | — | 134.4/137.3* |
| 13 | 2.31 (s) | 20.2 |
| 14 | 6.85 (s) | 130.3 |
| 15 | — | 134.4/137.3* |
| 16 | 2.20 (s) | 16.4 |

*The aromatic carbons 8, 12 and 15 are not assigned. Two signals are observed in $^{13}C$ NMR; there are probably two carbons which leave under the same signal.
The —C≡N→O function exhibits a characteristic IR band at 2295 $cm^{-1}$ Solvent used: $CDCl_3$—Calibration on the signal of chloroform at 7.2 ppm in $^1H$, 77 ppm in $^{13}C$.

II-2. Preparation of the Grafted Elastomer

II-2.1—Grafting of the Modifier onto an SBR in Bulk

The modifier obtained above is used.

2,4,6-trimethyl-3-(2-(2-oxoimidazolidin-1-yl)ethoxy) (2.72 g), with an NMR purity of 86 mol %, is incorporated into 30 g of SBR (containing 26% by weight of styrene and 24% by weight of 1,2-butadiene unit, with an Mn=162 900 g/mol and Ip=1.15) on a roll mill (external mixer at 30° C.). The mixture is homogenized in 15 turnover passes.

This mixing phase is followed by heat treatment in a press at a pressure of 10 bar.

The times and temperatures of this second step were varied.

$^1H$ NMR analysis allowed determination of the molar proportion of grafting and the molar yield of grafting, which are reported in table 5 below:

| time | Temperature | NMR proportion (mol %) | yield |
|---|---|---|---|
| 5 min | 110° C. | 1.55 | 90% |
| 10 min | 110° C. | 1.55 | 90% |
| 5 min | 150° C. | 1.55 | 90% |
| 10 min | 150° C. | 1.54 | 90% |

II-2.2—Grafting of the Modifier onto an SBR in Solution 2 g of SBR (containing 26% by weight of styrene and 24% by weight of 1,2-butadiene unit, with an Mn=162 900 g/mol and Ip=1.15) are redissolved in 50 ml of dichloromethane. A solution of 60 mg of 2,4,6-trimethyl-3-(2-(2-oxoimidazolidin-1-yl)ethoxy)nitrile oxide, with a $^1H$ NMR purity of 86 mol %, in 5 ml of dichloromethane is added to the polymer solution, and the reaction mixture is stirred at the reflux of the dichloromethane for 24 hours.

The polymer is subsequently coagulated in an acetone/methanol mixture. The polymer is redissolved in toluene and then subjected to antioxidant treatment by addition of 4 mg of 4,4'-methylene-bis-2,6-tert-butylphenol and 4 mg of N-(1,3-dimethylbutyl)-N'-phenyl-p-phenylenediamine. The polymer is dried under reduced pressure at 60° C. for 48 hours The $^1H$ NMR analysis indicates that the polymer has been modified to a level of 1 mol %, which is also equivalent to a molar grafting yield of 67%.

II-2.3—Grafting of the Modifier onto the Polyisoprene Natsyn 2200 (Goodyear)

The same modifier is used as that obtained above in example 1.

2.85 g of 2,4,6-trimethyl-3-(2-(2-oxoimidazolidin-1-yl)ethoxy), with an NMR purity of 86 mol %, is incorporated into 30 g of Natsyn 2200 [ML(1+4) 100° C.=79, 3,4 units=0.5%, 1,4-trans units=1.9%, 1,4-cis unit=97.6%, Mw=1044.103 g/mol, Ip=3.6] on a roll mill (external mixer at 30° C.). The mixture is homogenized in 15 turnover passes.

This mixing phase is followed by heat treatment in a press at a pressure of 10 bar.

The times and temperatures of this second step were varied.

$^1H$ NMR analysis allowed determination of the molar proportion of grafting and the molar yield of grafting, which are reported in table 6 below:

| time | Temperature | NMR proportion (mol %) | yield |
|---|---|---|---|
| 5 min | 130° C. | 1.52 | 88% |
| 10 min | 130° C. | 1.55 | 90% |
| 5 min | 150° C. | 1.54 | 90% |
| 10 min | 150° C. | 1.58 | 92% |

II-3. Preparation of the Compositions

The procedure for the tests below is as follows: the non-grafted diene elastomer or elastomers are introduced into a Polylab 85 $cm^3$ internal mixer, which is filled to 70% and whose initial vessel temperature is approximately 110° C. For the mixtures relating to the invention, the modifier is introduced at the same time as the diene elastomer and thermomechanical working is carried out for one minute at 25° C., with mixing of the whole mixture (productive phase) for approximately 5 to 6 minutes.

Subsequently, for all of the compositions (controls and inventive compositions), the optional reinforcing filler or fillers, the optional coupling agent and then, after one to two minutes of kneading, the various other ingredients, with the exception of the vulcanizing system are added. Thermomechanical working (non-productive phase) is then carried out in one step (total duration of kneading approximately 5 minutes), until a maximum "dropping" temperature of 160° C. is reached. The resulting mixture is recovered and cooled and then the vulcanizing system (sulphur) is added on an external mixer (homo-finisher) at 25° C., with mixing of the whole mixture (productive phase) for approximately 5 to 6 minutes.

The resulting compositions are subsequently calendared in the form of either plaques (thickness of 2 to 3 mm) or of thin sheets of rubber for the measurement of their physical or mechanical properties, or in the form of profiled elements which can be used directly, after cutting and/or assembling to the desired dimensions, for example as semi-finished products for tyres, more particularly as tyre treads.

II-3.1—Compositions Based on Carbon Black

The rubber compositions are given in table 7. The amounts are expressed in parts per 100 parts by weight of elastomer (phr).

TABLE 7

| Composition | Control composition | Composition SBR1 | Composition SBR2 |
|---|---|---|---|
| SBR (1) | 100 | 100 | 100 |
| Carbon black (2) | 50 | 50 | 50 |
| Modifier (3) | | 0.9 | 4.5 |
| ZnO (4) | 2 | 2 | 2 |
| Stearic acid (5) | 2.7 | 2.7 | 2.7 |
| Sulphur | 1.2 | 1.2 | 1.2 |
| CBS (6) | 1.9 | 1.9 | 1.9 |

(1) SBR prepared by anionic polymerization (containing 26% by weight of styrene and 24% by weight of 1,2-butadiene unit and with an Mn = 162 900 g/mol and Ip = 1.15).
(2) Carbon black N234
(3) modifier: 2,4,6-trimethyl-3-(2-(2-oxoimidazolidin-1-yl)ethoxy)nitrile oxide
(4) zinc oxide (industrial grade—from Umicore);
(5) Stearine ("Pristerene 4931"—from Uniqema);
(6) CBS: N-cyclohexyl-2-benzothiazyl-sulphenamide ("Santocure CBS" from Flexsys)

Characterization Tests—Results

The object of this example is to compare the properties of rubber compositions based on carbon black according to the invention, comprising a grafted SBR elastomer (compositions 1 and 2), to a comparative composition comprising the same but ungrafted SBR elastomer (control composition).

The results are reported in table 8.

TABLE 8

| Composition | Control composition | Composition SBR1 | Composition SBR2 |
|---|---|---|---|
| Mechanical properties in crosslinked state: Force-elongation properties at 23° C. | | | |
| Elongation at break (%) | 448 | 411 | 368 |
| Breaking stress (MPa) | 26.5 | 28.0 | 28.4 |
| ASM100% | 2.97 | 3.43 | 3.69 |
| ASM300% | 5.20 | 6.26 | 7.24 |
| ASM300/ASM100 | 1.75 | 1.83 | 1.96 |
| Force-elongation properties at 100° C. | | | |
| Elongation at break (%) | 274 | 290 | 274 |
| Breaking stress (MPa) | 11.3 | 14.1 | 14.3 |
| ASM100% | 2.75 | 2.93 | 2.85 |
| ASM300% | NM | NM | NM |
| ASM300/ASM100 | NM | NM | NM |
| Dynamic properties as function of strain | | | |
| $G^*_{(25\%)}$ (MPa) 23° C. | 2.74 | 2.68 | 2.36 |
| $\Delta G^*_{(100\%-0.1\%)}$ 23° C. (MPa) | 4.55 | 2.67 | 2.19 |
| tan(δ)max (23° C.) | 0.28 | 0.21 | 0.21 |
| $G^*_{(25\%)}$ (MPa) 100° C. | 1.83 | 2.09 | 1.81 |
| $\Delta G^*_{(100\%-0.1\%)}$ 100° C. (MPa) | 1.8 | 1.12 | 0.61 |
| tan(δ)max (100° C.) | 0.17 | 0.14 | 0.12 |

NM: not measurable

Compositions SBR1 and SBR2 at 23° C. and at 100° C. exhibit sharp decreases in Payne effect, as manifested in the decrease of hysteresis (tan δ max) in the course of a strain sweep under applied stress. This reduction in hysteresis is associated by the skilled person with an improvement in rolling resistance.

Unexpectedly, it is notable to observe that this increase in stiffness at 100° C. is not accompanied by a decline in elongation at break. Indeed, the skilled person is aware that increasing the crosslinking density and/or the rubber/filler bonding density is accompanied by a decrease in elongation at break being observed.

It is therefore found that the rubber compositions in accordance with the invention, based on carbon black and comprising a grafted elastomer, have high ASM moduli in tandem with a significant increase in the properties at break and also a very sharp lowering in the hysteresis of the composition.

II-3.2—Compositions Based on Silica

The rubber compositions are given in table 9. The amounts are expressed in parts per 100 parts by weight of elastomer (phr).

TABLE 9

| | Control composition | Composition SBR3 |
|---|---|---|
| SBR (1) | 100 | 100 |
| Carbon black (2) | 3 | 3 |
| Silica (3) | 55 | 55 |
| Modifier (4) | | 4.25 |
| Coupling agent (5) | 5.5 | 5.5 |
| 6PPD (6) | 1.5 | 1.5 |
| TMQ (7) | 1 | 1 |
| paraffin | 1 | 1 |
| ZnO (8) | 2.7 | 2.7 |
| stearic acid (9) | 2.5 | 2.5 |
| Sulphur | 1.5 | 1.5 |
| CBS (10) | 1.8 | 1.8 |

(1) SBR prepared by anionic polymerization (containing 26% by weight of styrene and 24% by weight of 1,2-butadiene unit and with an Mn = 162 900 g/mol and Ip = 1.15).
(2) Carbon black N234
(3) "ZEOSIL 1165 MP" silica from Rhodia, in the form of micropearls (BET and CTAB: approximately 150-160 m2/g);
(4) 2,4,6-trimethyl-3-(2-(2-oxoimidazolidin-1-yl)ethoxy)nitrile oxide
(5) TESPT ("SI69" from Degussa);
(6) N-1,3-dimethylbutyl-N-phenyl-para-phenylenediamine ("Santoflex 6-PPD" from Flexsys);
(7) 2,2,4-trimethyl-1,2-dihydroquinoline
(8) zinc oxide (industrial grade—from Umicore);
(9) Stearine ("Pristerene 4931"—from Uniqema);
(10) CBS: N-cyclohexyl-2-benzothiazyl-sulphenamide ("Santocure CBS" from Flexsys)

Characterization Tests—Results

The object of this example is to compare the properties of a rubber composition based on silica according to the invention, comprising a grafted SBR elastomer (composition 3), to a comparative composition comprising the same but ungrafted SBR elastomer (control composition).

The results are reported in table 10.

TABLE 10

| | Control composition | Composition SBR 3 |
|---|---|---|
| Mechanical properties in crosslinked state: Force-elongation properties at 23° C | | |
| Elongation at break (%) | 390 | 384 |
| Breaking stress (MPa) | 25.1 | 33.7 |
| ASM100% | 3.31 | 3.49 |
| ASM300% | 4.68 | 6.44 |
| ASM300/ASM100 | 1.41 | 1.85 |

TABLE 10-continued

| | Control composition | Composition SBR 3 |
|---|---|---|
| Dynamic properties as function of strain | | |
| $G^*_{(25\%)}$ (MPa) 23° C. | 2.96 | 2.99 |
| $\Delta G^*_{(100\%-0.1\%)}$ 23° C. (MPa) | 4.03 | 1.52 |
| tan(δ)max 23° C. | 0.22 | 0.15 |

Composition SBR3 at 23° C. exhibits a sharp decrease in Payne effect, as manifested in the decrease of hysteresis (tan (δ)max) in the course of a strain sweep under applied stress.

Unexpectedly, it is notable to observe that this increase in stiffness at 23° C. is not accompanied by a decline in elongation at break.

It is therefore found that the rubber composition in accordance with the invention, based on silica and comprising a grafted elastomer, has high ASM 100% and ASM 300% moduli in tandem with a significant increase in the properties at break and also a very sharp lowering in the hysteresis of the composition.

The invention claimed is:

1. A rubber composition based on at least one diene elastomer, a reinforcing filler, a chemical crosslinker and a modifier, optionally already grafted onto the elastomer, selected from compounds comprising at least one group Q, and at least one group A, which are joined to one another by at least one spacer group Sp, wherein:

Q comprises a dipole containing at least one nitrogen atom,

A comprises an associative group comprising at least one nitrogen atom, wherein A is selected from imidazolidinyl, triazolyl, triazinyl, bis-ureyl, and ureido-pyrimidyl groups Sp is an atom or group of atoms forming a bond between Q and A.

2. The composition according to claim 1, wherein the group A conforms to one of the formulae (II) to (VI) below:

(II)

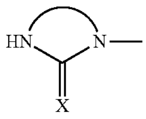

(III)

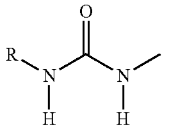

(IV)

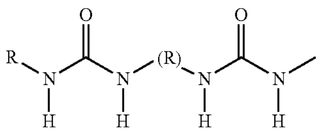

(V)

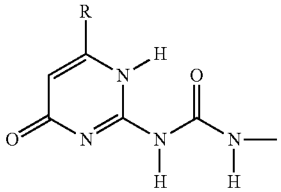

-continued (VI)

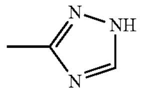

where:

R denotes a hydrocarbon group optionally containing heteroatoms,

X denotes an oxygen or sulphur atom.

3. The composition according to claim 1, wherein Q comprises a nitrile oxide, nitrone or imine nitrile function.

4. The composition according to claim 1, wherein the group Q is a group of formula (VII), (VIII) or (IX) below:

(VII)

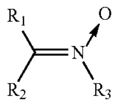

(VIII)

$$R_4—C\equiv N\rightarrow O$$

(IX)

$$R_5—C\equiv N\rightarrow N—R_6$$

in which $R_1$ to $R_6$ are selected independently from a spacer group Sp, a hydrogen atom, a linear or branched $C_1$-$C_{20}$ alkyl group, a linear or branched $C_3$-$C_{20}$ cycloalkyl group, a linear or branched $C_6$-$C_{20}$ aryl group and a group of formula (X)

(X)

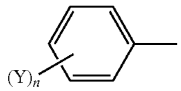

wherein n represents 1, 2, 3, 4 or 5, and each Y represents independently a spacer group Sp, an alkyl group, or a halide.

5. The composition according to claim 1, wherein the spacer group is a $C_1$-$C_{24}$ linear or branch alkyl chain, optionally comprising one or more heteroatoms selected from nitrogen, sulphur, silicon or oxygen atoms.

6. The composition according to claim 1, wherein the group Q is a group of formula (XIa) or (XIb):

(XIa)

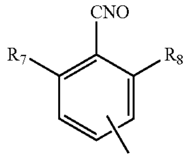

-continued (XIb)

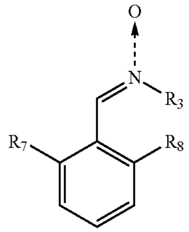

wherein $R_7$ and $R_8$ represent independently a hydrogen or a $C_1$-$C_5$ alkyl group, an alkoxy, or a halide, $R_3$ is selected independently from a spacer group Sp, a hydrogen atom, a linear or branched $C_1$-$C_{20}$ alkyl group, a linear or branched $C_3$-$C_{20}$ cycloalkyl group, a linear or branched $C_6$-$C_{20}$ aryl group and a group of formula (X)

(X)

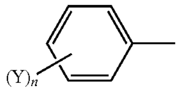

wherein n represents 1, 2, 3, 4 or 5 and each Y represents independently a spacer group Sp, an alkyl group or a halide, and the group A is a group of formula (XII)

(XII)

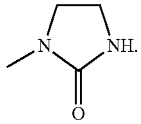

7. The composition according to claim 1, wherein the modifier is selected from the compounds of formula (XIII) to (XXI) below:

(XIII)

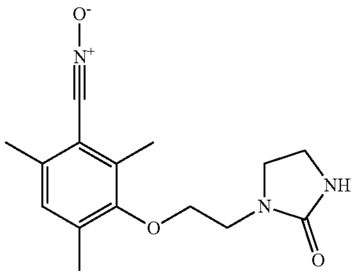

(XIV)

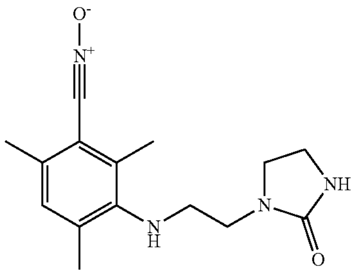

-continued (XV)

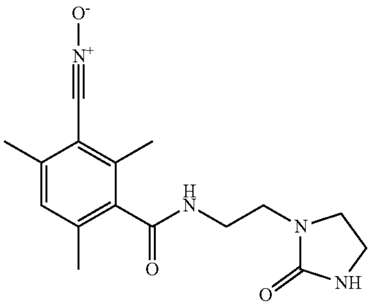

(XVI)

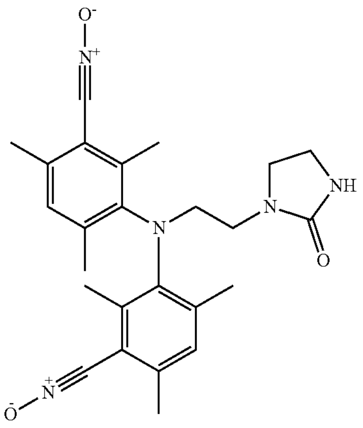

(XVII)

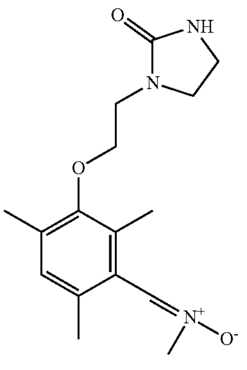

(XVIII)

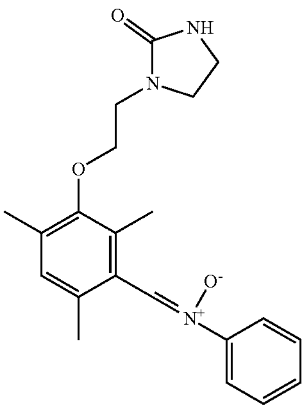

-continued (XVII)

(XIX)

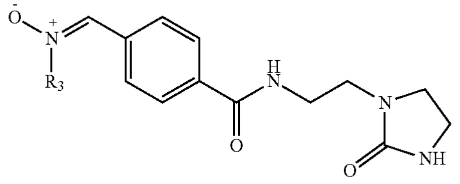

where $R_3$ is selected from a spacer group Sp, a hydrogen atom, a linear or branched $C_1$-$C_{20}$ alkyl group, a linear or branched $C_3$-$C_{20}$ cycloalkyl group, a linear or branched $C_6$-$C_{20}$ aryl group and a group of formula (X)

(X)

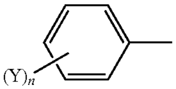

wherein n represents 1, 2, 3, 4 or 5, and each Y represents independently a spacer group Sp, an alkyl group, or a halide (XX)

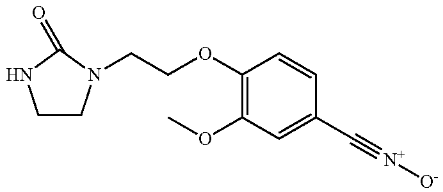

(XXI)

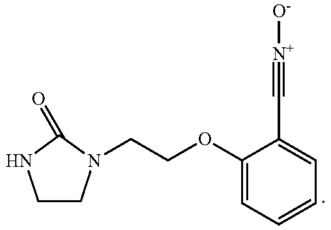

8. The composition according to claim 1, wherein the modifier is selected from the compounds of formula (XXII) and (XXIII) below:

(XXII)

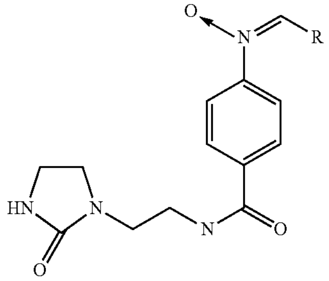

(XXIII)

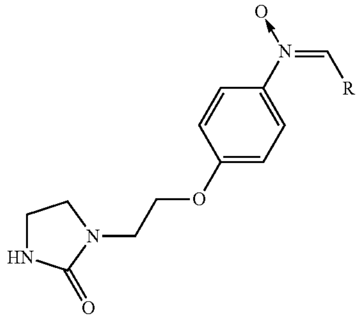

9. The composition according to claim 1, wherein the diene elastomer is a substantially unsaturated diene elastomer selected from natural rubber, synthetic polyisoprenes, polybutadienes, butadiene copolymers, isoprene copolymers and mixtures of these elastomers.

10. The composition according to claim 1, wherein the diene elastomer is a substantially saturated elastomer selected from butyl rubbers and the copolymers of dienes and alpha-olefins such as EPDMs.

11. The composition according to claim 1, wherein the chemical crosslinker comprises 0.5 to 12 phr of sulphur, or 1 to 10 phr of sulphur, or 0.01 to 10 phr of one or more peroxide compounds.

12. The composition according to claim 1, wherein the proportion of modifier varies from 0.01 to 50 mol %, or from 0.01 mol % to 5 mol %.

13. A tire comprising a rubber composition as described in claim 1.

14. The composition according to claim 5, wherein the spacer group is a $C_1$-$C_{10}$ linear or branched alkyl chain optionally comprising one or more heteroatoms selected from nitrogen, sulphur, silicon, or oxygen atoms.

15. The composition according to claim 6, wherein $R_7$ and $R_8$ represent independently a $C_1$-$C_5$ alkyl group or a halide.

16. The composition according to claim 15, wherein $R_7$ and $R_8$ represent independently a methyl group or a chlorine atom.

17. The composition according to claim 1, wherein there is one spacer group Sp.

18. The composition according to claim 1, wherein Q comprises a dipole containing one nitrogen atom.

19. The composition according to claim 2, wherein X denotes an oxygen atom.

* * * * *